Patented Sept. 16, 1941

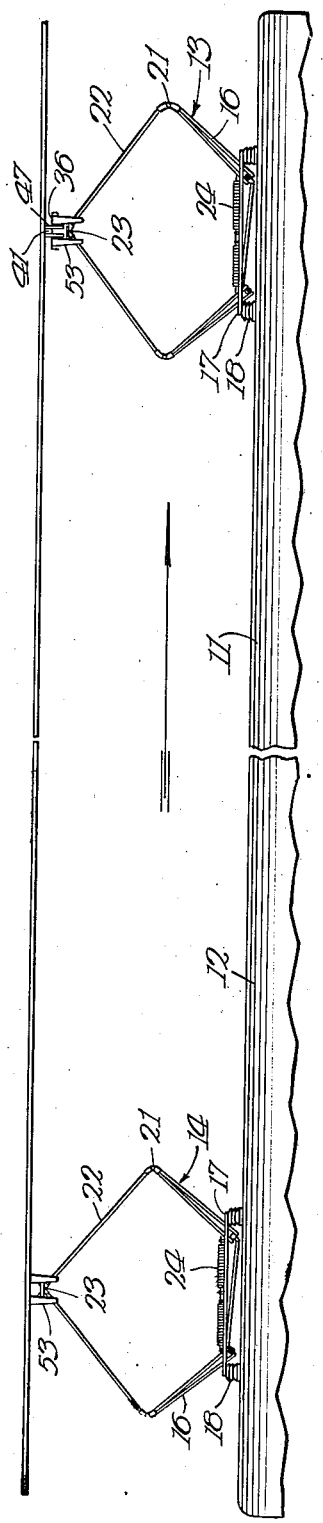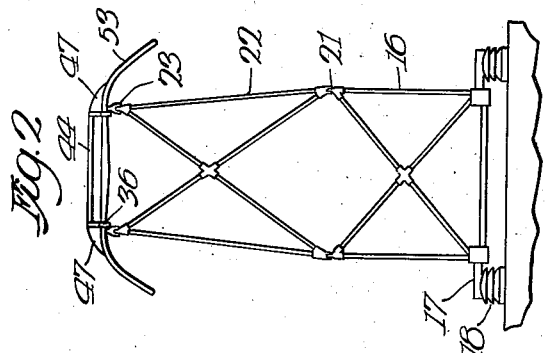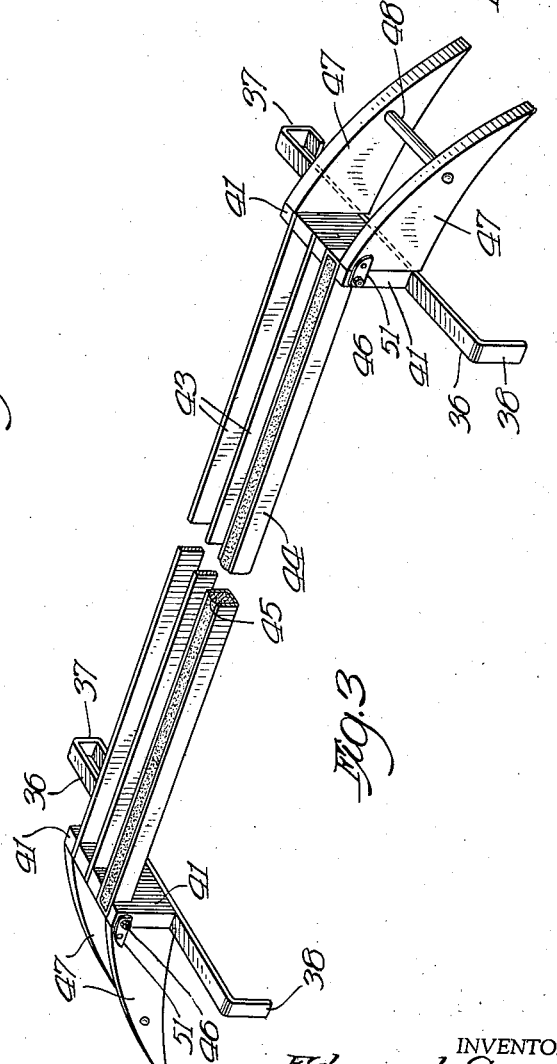

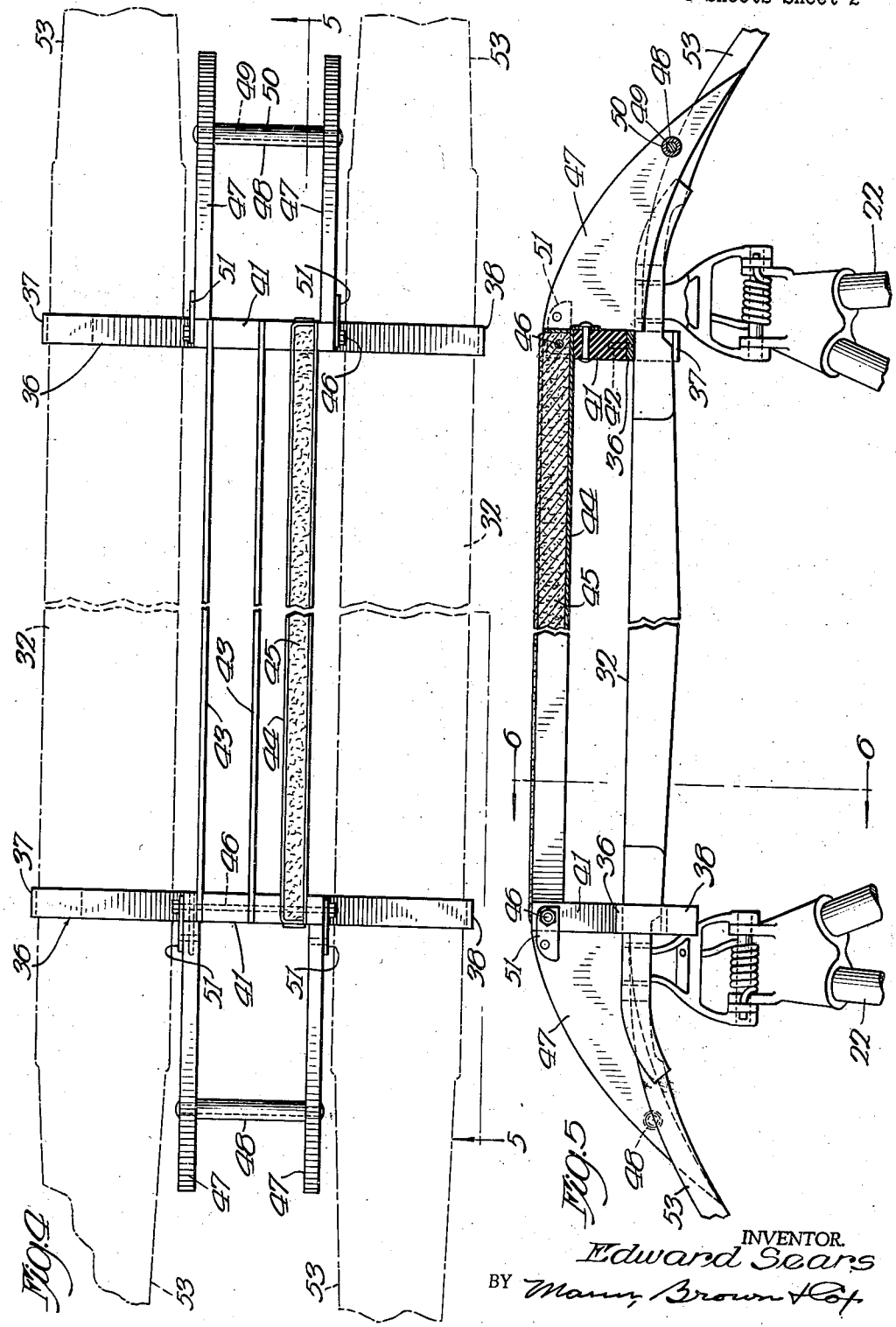

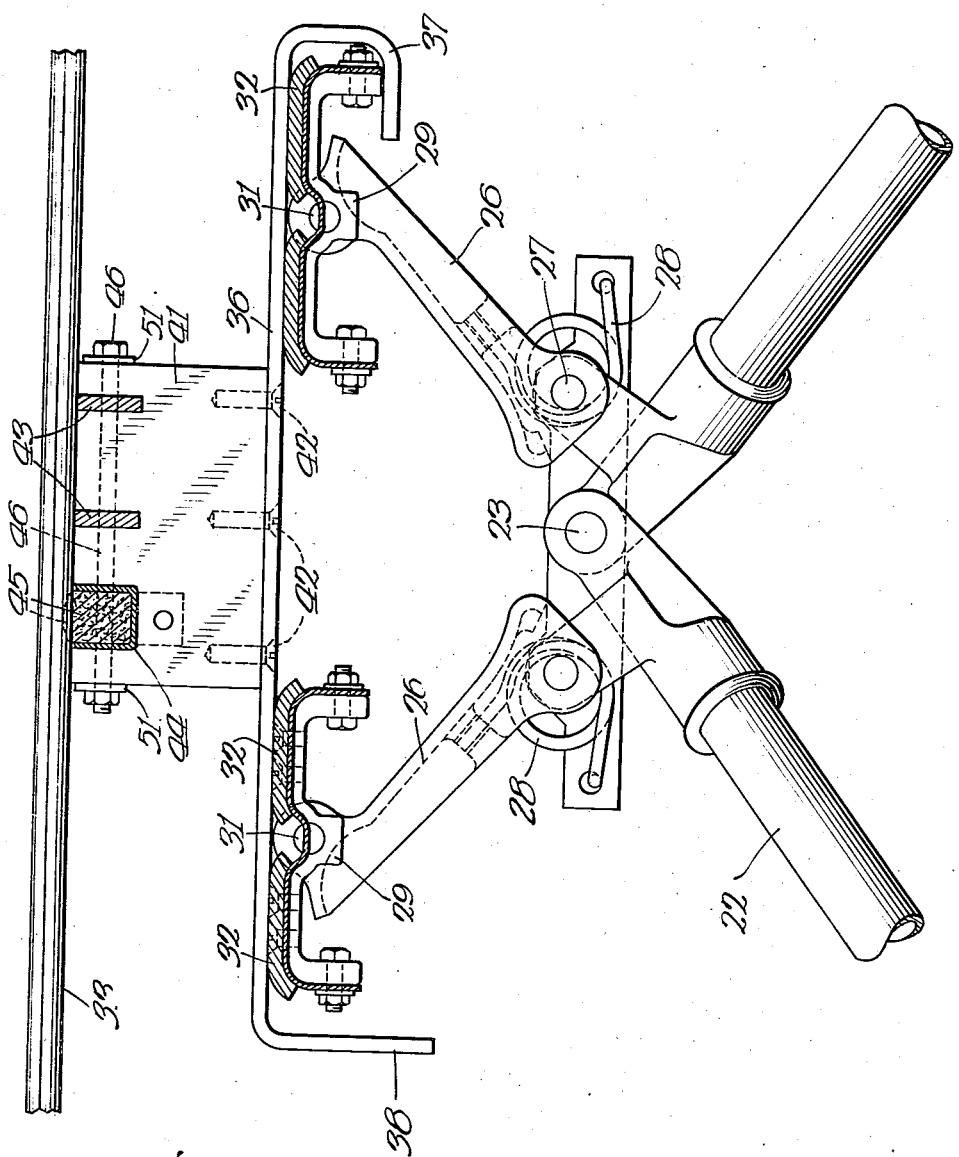

2,256,357

UNITED STATES PATENT OFFICE 2,256,357

SLEET SCRAPER

Edward Sears, Deer Lodge, Mont.

Application March 9, 1940, Serial No. 323,234

13 Claims. (Cl. 191—62)

In sleety weather ice forms on overhead exposed trolley wires, encasing them in sheaths of ice. As the ice gets between the trolley wire and the current collector running along the wire, the collector is separated from the wire resulting in severe arcing between the collector and the wire and also in loss of power. Many people living near overhead trolley systems are familiar with this phenomenon since at night the arcing of the current between the collector and the trolley wire sends forth bright flashes of light which seem almost like lightning. Aside from representing a loss of power, the arc is often quite harmful, tending to burn or melt the surfaces of the trolley wire and the collector.

Although a great deal of money has been spent developing sleet removers for trolley wires, they have not been entirely satisfactory heretofore, one of the reasons for this being the difficulty of applying and removing them as varying conditions required. Most of the development has taken place on the pole and wheel type of collector most common on streetcars in the cities, the pantograph type of collector presenting difficult problems for the solution of which the prior developments in pole type collectors were of no help.

According to the present invention a sleet remover has been developed which is highly satisfactory for use on pantographs. In its preferred form it comprises a device which can be slipped onto a lowered pantograph without the necessity of fastening any securing means, being held in place by the natural action of the pantograph when it is raised. The device includes scraper bars which extend to both sides of the trolley wire far enough so that under normal conditions the trolley wire will always ride on the scraper bars. To take care of exceptional circumstances in which the trolley wire might run off of the scraper, guides are provided which cooperate with the guides of the pantograph so that, as the pantograph returns to a position under the wire, the wire will ride up onto the guides and onto the scraper bars. The preferred form of scraper also includes a bar of lubricant such as graphite, which runs along the trolley wire a slight distance behind the scraper so that if the scraper removes the lubricant from the trolley wire, this will be replaced immediately by the lubricant bar so that lubricant will be provided for the collector pantograph, which follows the sleet scraping pantograph.

Additional objects and advantages of the invention will be apparent from the following description and from the drawings, in which:

Fig. 1 is a somewhat diagrammatic view showing two successive pantographs, the first of which is provided with the sleet scraper comprising the preferred form of this invention and the second of which is serving as a collector.

Fig. 2 is a front view of the extended pantograph with the sleet scraper fitted thereon.

Fig. 3 is a perspective view of the preferred form of sleet scraper.

Fig. 4 is a top view of the scraper shown in Fig. 3, showing in dotted lines the pantograph to which it may be applied.

Fig. 5 is a rear view of the pantograph of the sleet scraper of Fig. 3 as applied to a pantograph, the parts being partly broken away and shown in section for the sake of clarity.

Fig. 6 is a sectional view taken on the line 6—6 of Fig. 5 and showing the parts as the pantograph is being raised to apply the scraper to a trolley wire.

A preferred form of the invention has been chosen for illustration and description, in compliance with section 4888 of the Revised Statutes, but persons skilled in the art will readily perceive other means for accomplishing the same results, and the claims are therefore to be construed as broadly as possible, consistent with the prior art.

The invention has been illustrated in connection with an electric locomotive 11 which may include a front car 11 and a rear car 12, and each of which carries a pantograph generally indicated at 13 and 14 respectively, which for the purpose of this invention may be considered as conventional. Of course, both pantographs could be on one car, although in most instances there will be two cars, each having a pantograph thereon. The front pantograph 13 may be used for sleet scraping, and the rear pantograph 14 may engage the trolley wire for current collecting. Each pantograph may include two lower frames 16 pivotally supported by a base 17 resting on insulators 18 on the car roof. Each of the frames 16 is pivoted at 21 to an upper frame 22. The upper frames are pivoted together at 23. Springs 24 tend to pivot the lower frames 16 toward one another and thus raise the pivotal point 23. Pivoted to each upper frame 22 are arms 26, each pivoted at 27 and urged toward the other by a spring 28. Two arms 26 are thus pivoted to each frame 22, and to this pair of arms a shoe 29 is pivoted at 31. Each of the shoes 29 bears copper strips 32 thereon. These copper strips extend longitudinally of the shoe 29 (transversely of the trolley wire 33) and form the collector contact for running on the trolley wire 33 to collect the current therefrom.

The preferred form of the sleet scraper of this invention is shown in Fig. 3. It is mounted on a pantograph by means of brackets 36, the shape and function of which can be explained best with reference to Fig. 6. At its forward end each bracket 36 has a hook-shaped portion 37 which fits around and under the forward shoe 29 of the pantograph. At its rearward end each bracket 36 has a downwardly extending leg 38. When a pantograph is lowered, the springs 28 urge the shoes 29 toward one another, stops usually being provided for limiting their movement toward one another to about the position shown in Fig. 6, although the stops may permit them to move somewhat closer together than here shown. When they are even as close together as shown in Fig. 6, it is easy to hook the hooks 37 around the front of the front shoe 29 and drop the sleet scraper so that the leg 38 slips behind the rear shoe 29 with the horizontal portion of the bracket 36 resting on the two shoes. When the pantograph is raised under action of springs 24 to press the sleet scraper against the trolley wire 33, the pressure will cause the arms 26 and shoes 29 to spread apart, Fig. 6 showing the position of parts when the spreading apart is just beginning. With further upward movement of the pantograph, the shoes 29 will spread apart until they press against the inside of the front of hook 37 and the inside of leg 38. This will in effect clamp the sleet scraper securely in place. Of course, formations could be provided on the screws which would interlock with hooks 37 to prevent lateral displacement, although the clamping action normally serves this function.

To each of the brackets 36 there is secured an insulating block 41. The block may be formed of fiber and may be secured in any convenient manner as by screws 42.

Secured in notches in the blocks 41 are the sleet scraping bars 43 and a channel 44 containing a lubricant 45. The bars 43 and channel 44 may be secured by bolts 46. The scraping bars 43 may be steel bars, the edges thereof, or at least the top leading edge, being relatively sharp. Although two scraper bars have been shown, one may be used alone and in fact it could be used even without the lubricating channel 44. Lubricants for trolley wires are well known. Any suitable lubricant may be used, a baked graphite composition disclosed in Williams Patent No. 2,073,189 having been found most satisfactory. This material would initially project above the channel 44 as seen, for example, in dotted lines in Fig. 6, although near the center it will become flattened down somewhat, as is likewise seen in Fig. 6.

Also secured to the insulating blocks 41 are horns 47 which may also be formed of fiber. By providing two horns extending outwardly from each of the blocks 41 and securing the horns together by a brace 48, the horn construction will be quite rigid. As seen best in Fig. 5, the brace 48 may comprise a bolt 49 extending through the horns with a spacing sleeve 50 positioned between the horns. Bracing links 51 may also be provided.

As seen best in Fig. 2, the horns 47 extend downwardly and outwardly from a position as high as the top surface of the sleet scraper to a position between the pantograph horns 53 so that the horns 47 thus serve as extensions of the pantograph horns 53. As is well known, the pantograph horns 53 serve to raise the trolley wire 33 and guide it up over the pantograph. Thus, if on a curve the pantograph should swing outwardly with respect to the trolley wire and the trolley wire should slide off of the pantograph, it will in swinging back strike the horn 53 and slide up on the horn back onto the pantograph. With the sleet scraper in position the same action will take place except that as the wire reaches the top of the pantograph horn 53 it will come onto the sleet scraping horn 47 and thus be carried on up to the top of the sleet scraper.

In view of the foregoing description, the operation may be described quite briefly. The sleet scraper of the present invention is used on the front pantograph with the rear pantograph collecting current. To apply it the pantograph is lowered, the hooks 37 are hooked around the front shoe, and the legs 38 are dropped behind the rear shoe. The pantograph is then raised to press the sleet scraper against the trolley. The pressure causes the shoes 29 of the pantograph to spread apart and to spread against the hook 37 and leg 38, thus clamping the sleet scraper in place. As the locomotive moves, the scraper bars 43 will scrape the ice off of the trolley wire 33 and the channel 44 will apply a lubricant 45 thereto. Since the scraper bars 43 and channel 44 are insulated from the pantograph by insulating blocks 41, no current will pass between the trolley wire and the pantograph 13. Accordingly, there will be no arcing with its injurious effects. The pantograph 14 will function in the usual way, collecting current from the trolley wire 33 which will be clean and lubricated.

From the foregoing it is seen that a sleet scraper is provided which will be highly satisfactory for use with pantographs. It may be applied and removed from the pantograph almost instantaneously and requires no special tools for its application. It leaves the pantograph unchanged so that merely by removing the sleet scraper from it the pantograph may be again used for collecting. The sleet scraper is provided with a lubricant so that it leaves the trolley wire properly lubricated. It is also provided with horns which form extensions of the pantograph horns so that if the wire slips off of the sleet scraper on curves or the like it will be guided from the pantograph horns up onto the top of the sleet scraper.

I claim:

1. A sleet scraper for pantographs, including a pair of brackets having hook-shaped front ends adapted to fit around and rest on a forward pantograph shoe and downward extensions at the rear ends adapted to fit behind the rear pantograph shoe, insulating blocks secured to the brackets, a sleet scraping bar secured to the insulating blocks, and guiding horns extending from approximately even with the top surface of the bar outwardly and downwardly to a position adapted to lie below the top of the guides of the pantograph.

2. A sleet scraper for pantographs, including bracket means having hook-shaped front ends adapted to fit around and rest on a forward pantograph shoe and downward extensions at the rear ends adapted to fit behind the rear pantograph shoe, a sleet scraping bar carried by the bracket means and continuous across the center of the pantograph shoe, and guiding means having the top surface thereof extending from approximately even with the top surface of the bar outwardly and downwardly to a position adapted to lie below the top of the guides of the pantograph.

3. A sleet scraper for pantographs, including bracket means having hook-shaped front ends adapted to fit around and rest on a forward pantograph shoe and downward extensions at the rear ends adapted to fit behind the rear pantograph shoe, insulating blocks secured to the brackets, and a sleet scraping bar secured to the insulating blocks.

4. A sleet scraper for pantographs, including bracket means having hook-shaped front ends adapted to fit around and rest on a forward pantograph shoe with the ends of the hook portions extending rearwardly thereunder, and downward extensions at the rear ends adapted to fit behind the rear pantograph shoe, and a sleet scraping bar carried by said bracket means.

5. A sleet scraper for two-shoe pantographs, including a scraper bar and means for carrying the scraper bar having means fitting in front of the front shoe and in back of the back shoe so constructed and arranged that the means is adapted to be secured to a pantograph by the natural spreading action of the pantograph in pressing the sleet scraper against a trolley wire.

6. A sleet scraper for two-shoe pantographs, including a scraper bar, support means for carrying the scraper bar having means fitting in front of the front shoe and in back of the back shoe so constructed and arranged that the means is adapted to be secured to a pantograph by the natural spreading action of the pantograph in pressing the sleet scraper against a trolley wire, and guiding means having the top surface thereof extending from approximately even with the top surface of the bar outwardly and downwardly to a position adapted to lie below the top of the guides of the pantograph.

7. A sleet scraper for pantographs, including a scraper bar, support means for carrying the scraper bar and adapted to be readily secured removably on top of a pantograph in a position to space the pantograph shoe from a trolley wire, and guiding means having the top surface thereof extending from approximately even with the top surface of the bar outwardly and downwardly to a position adapted to lie below the top of the guides of the pantograph.

8. A sleet scraper for pantographs, including a scraper bar, support means for carrying the scraper bar and adapted to be readily secured removably on top of a pantograph in a position to space the pantograph shoe from a trolley wire, and guiding means having the top surface thereof extending from approximately even with the top surface of the bar outwardly and downwardly to a position adapted to lie below the top of the guides of the pantograph, said support means being adapted to insulate the scraper bar from the pantograph.

9. A sleet scraper for pantographs, including a scraper bar, support means for carrying the scraper bar and adapted to be readily secured removably on top of a pantograph in a position to space the pantograph shoe from a trolley wire, and a lubricating bar also carried by the support means and adapted to engage a trolley wire simultaneously with the scraper bar.

10. A sleet scraper for pantographs, including a scraper bar, support means for carrying the scraper bar and adapted to be readily secured removably on top of a pantograph in a position to space the pantograph shoe from a trolley wire, and a lubricating bar also carried by the support means and adapted to engage a trolley wire simultaneously with the scraper bar, said support means being adapted to insulate the scraper and lubricating bars from the pantograph.

11. The combination of a pantograph including a pair of generally parallel shoes adapted to lie at right angles to a trolley wire and adapted to spread apart as they are raised against the trolley wire, and a sleet scraper including supporting means adapted to lie on the shoes and to extend downwardly in front of the front shoe and to the rear of the rear shoe whereby the spreading action of the shoes will lock said supporting means in place, and a scraper bar carried by said supporting means and adapted to lie across the wire.

12. The combination of a pantograph including a pair of generally parallel shoes adapted to lie at right angles to a trolley wire and adapted to spread apart as they are raised against the trolley wire and guides extending downwardly and outwardly therefrom, and a sleet scraper including supporting means adapted to lie on the shoes and to extend downwardly in front of the front shoe and to the rear of the rear shoe whereby the spreading action of the shoes will lock said supporting means in place, a scraper bar carried by said supporting means and adapted to lie across the wire, and guiding means having the top surface thereof extending from approximately even with the top surface of the bar outwardly and downwardly to a position adapted to lie below the top of the guides of the pantograph.

13. A sleet scraper adapted for use on that type of pantograph including a pair of generally parallel shoes adapted to lie at right angles to a trolley wire and supported in such a way as to spread apart as they are raised against the trolley wire, which comprises supporting means adapted to lie on the shoes and having portions extending downwardly in front of the front shoe and to the rear of the rear shoe and spaced far enough apart to permit the supporting means to be slipped onto the pantograph when the pantograph is in a lowered position but being sufficiently close together to cause the supporting means to be locked in place by the spreading action of the shoe when the pantograph is raised against the trolley wire, and a scraper bar carried by said supporting means and adapted to lie across the trolley wire.

EDWARD SEARS.